US012583745B2

(12) United States Patent

Almulla et al.

(10) Patent No.: US 12,583,745 B2
(45) Date of Patent: Mar. 24, 2026

(54) PROCESS TO HYDROTHERMALLY PRODUCE GASES FROM RESIDUE STREAMS USING A SERIES OF REACTORS

(71) Applicant: Saudi Arabian Oil Company, Dhahran (SA)

(72) Inventors: Faisal Almulla, Dhahran (SA); Mazin Fathi, Dhahran (SA); Mohammed Dossary, Dhahran (SA)

( * ) Notice: Subject to any disclaimer, the term of this patent is extended or adjusted under 35 U.S.C. 154(b) by 691 days.

(21) Appl. No.: 18/055,059

(22) Filed: Nov. 14, 2022

(65) Prior Publication Data

US 2024/0158228 A1      May 16, 2024

(51) Int. Cl.
C01B 3/40          (2006.01)
B01J 8/06          (2006.01)
(Continued)

(52) U.S. Cl.
CPC ................. C01B 3/40 (2013.01); B01J 8/065 (2013.01); B01J 19/242 (2013.01); B01J 23/06 (2013.01);
(Continued)

(58) Field of Classification Search
CPC ... C01B 3/40; C01B 3/382; C01B 2203/0233; C01B 2203/1076; C01B 2203/1252;
(Continued)

(56) References Cited

U.S. PATENT DOCUMENTS 3,850,738 A      11/1974   Stewart, Jr. et al.
8,202,913 B2      6/2012   Robinson et al.
(Continued)

FOREIGN PATENT DOCUMENTS

JP          2000192055 A      7/2000
JP          2001080903 A      3/2001

OTHER PUBLICATIONS

Ferreira-Pinto et al.; "Experimental Basic Factors in the Production of H2 Via Supercritical Water Gasification", International Journal of Hydrogen Energy, 44(47), 2019, pp. 25365-25383.
(Continued)

*Primary Examiner* — Daniel C. McCracken
*Assistant Examiner* — Starfari Teshawn McClain
(74) *Attorney, Agent, or Firm* — Bracewell LLP; Constance G. Rhebergen; Eleanor T. Porter

(57)          ABSTRACT

A process for hydrogen production, the process comprising the steps of mixing hot water and hot oil to produce a mixed stream; increasing a temperature of the mixed stream to produce a reactor feed; upgrading the reactor feed in the non-catalytic reactor to produce a non-catalytic effluent, wherein a temperature in non-catalytic reactor is between 375° C. and 500° C., wherein the non-catalytic reactor is in the absence of catalyst; upgrading the catalytic feed in the catalytic reactor to produce a reactor effluent, wherein a temperature in catalytic reactor is between 550° C. and 700° C., wherein the catalyst is selected from the group consisting of transition metal oxides, lanthanide oxides, and combinations of the same, separating the reactor effluent in the high pressure separator to produce a gases stream; and separating the gases stream in the gases separator to produce a gas product and a light hydrocarbon stream.

7 Claims, 2 Drawing Sheets

(51) Int. Cl.

| | | |
|---|---|---|
| *B01J 19/24* | (2006.01) | |
| *B01J 23/06* | (2006.01) | |
| *C01B 3/38* | (2006.01) | |
| *C01B 3/382* | (2026.01) | |
| *C10G 9/20* | (2006.01) | |

(52) U.S. Cl.
CPC ...... *C01B 3/382* (2013.01); *C01B 2203/0233* (2013.01); *C01B 2203/1076* (2013.01); *C01B 2203/1252* (2013.01); *C10G 9/20* (2013.01)

(58) Field of Classification Search
CPC ............... C01B 2203/048; C01B 3/38; C01B 2203/0211; C01B 2203/04; C01B 2203/0495; C01B 2203/1211; C01B 2203/142; C01B 3/32; B01J 8/065; B01J 19/242; B01J 23/06; B01J 23/92; B01J 35/40; C10G 9/20
See application file for complete search history.

(56) References Cited

U.S. PATENT DOCUMENTS

| | | | |
|---|---|---|---|
| 9,051,521 B2 | 6/2015 | Yarbo | |
| 9,359,917 B2 | 6/2016 | Koseoglu et al. | |
| 10,752,847 B2 | 8/2020 | Choi et al. | |
| 11,034,897 B1 * | 6/2021 | Al Kaabi | C10G 3/40 |
| 11,286,434 B2 | 3/2022 | Choi | |
| 2004/0232046 A1 | 11/2004 | Tanaka et al. | |
| 2009/0206007 A1 | 8/2009 | Allam | |
| 2011/0065017 A1 * | 3/2011 | Ha | H01M 4/9016 |
| | | | 502/305 |
| 2014/0109465 A1 | 4/2014 | Coppola et al. | |
| 2019/0040329 A1 * | 2/2019 | Moore | C10G 69/04 |

OTHER PUBLICATIONS

Lee et al.; "Hydrogen Production from Fluidized Bed Steam Reforming of Hydrocarbons" Korean J. Chem. Eng. 15(6), 1998; pp. 658-662.

\* cited by examiner

PROCESS TO HYDROTHERMALLY PRODUCE GASES FROM RESIDUE STREAMS USING A SERIES OF REACTORS

TECHNICAL FIELD

Disclosed are systems and methods for production of hydrogen. Specifically, disclosed are systems and methods for production of hydrogen from liquid hydrocarbons in a two-step process.

BACKGROUND

The demand for industrial hydrogen is increasing due to the demand of cleaner fuels and power generation. Hydrogen is mainly produced via steam reforming by utilizing natural gas feedstock (for example methane), the catalytic reforming of naphtha, or via partial oxidation/gasification.

The properties of water, at supercritical conditions, are unique which make it suitable for upgrading and gasifying hydrocarbon streams. In the supercritical state (temperatures greater than 374° C. and pressures greater than 22 MPa), water can dissolve hydrocarbons due to its very low dielectric constant. At supercritical conditions, the dielectric constant of water is comparable to toluene making it an excellent medium for upgrading and enabling oil cracking into lighter hydrocarbons while reducing large radical's polymerization reactions, which leads to coke formation. The supercritical water gasification (ScWG) takes place at temperatures greater than 500° C. and pressures higher than 250 bar. At these conditions, the products are mainly in gas phase (for example hydrogen, methane, ethane) with low formation of coke or tars.

SUMMARY

Disclosed are systems and methods for production of hydrogen. Specifically, disclosed are systems and methods for production of hydrogen from liquid hydrocarbons in a two-step process.

In a first aspect, a process for hydrogen production is provided. The process includes the steps of mixing hot water and hot oil in a mixer to produce a mixer to produce a mixed stream, increasing a temperature of the mixed stream in a combined heater to produce a reactor feed, where the temperature of the reactor feed is between 374° C. and 500° C. and the pressure is between 22 MPa and 30 MPa, introducing the reactor feed to a non-catalytic reactor, and upgrading the reactor feed in the non-catalytic reactor to produce a non-catalytic effluent, where a temperature in non-catalytic reactor is between 375° C. and 500° C. and a pressure is between 22 MPa and 30 MPa, where the non-catalytic reactor is in the absence of catalyst, where hydrocarbons undergo cracking in the non-catalytic reactor. The process includes the steps of mixing the non-catalytic effluent with a fresh catalyst stream to product catalytic feed, introducing the catalytic feed to a catalytic reactor, upgrading the catalytic feed in the catalytic reactor to produce a reactor effluent, where a temperature in catalytic reactor is between 550° C. and 700° C. and a pressure is between 22 MPa and 30 MPa, where the catalyst is selected from the group consisting of transition metal oxides, lanthanide oxides, and combinations of the same, where the size of the catalyst is between 1,000 nm and 5,000 nm, introducing the reactor effluent to a high pressure separator, separating the reactor effluent in the high pressure separator to produce a gases stream and a liquid stream, introducing the gases stream to a gases separator, where the gases stream includes gases selected from light hydrocarbon gases, hydrogen, carbon monoxide, carbon dioxide, and combinations of the same, and separating the gases stream in the gases separator to produce a gas product and a light hydrocarbon stream.

In certain aspects, the process further includes the steps of introducing a water stream to a water pump, increasing a pressure of the water stream in the water pump to produce a pressurized water, where a pressure of the pressurized water is between 22 MPa and 30 MPa, introducing the pressurized water to a water heater, and increasing a temperature of the pressurized water in the water heater to produce the hot water, where a temperature of the hot water is between 350° C. and 500° C. In certain aspects, the process further includes the steps of introducing an oil feed to an oil pump, increasing a pressure of the oil feed in the oil pump to produce a pressurized oil, where a pressure of the pressurized oil is between 22 MPa and 30 MPa, introducing the pressurized oil to an oil heater, and increasing a temperature of the pressurized oil in the oil heater to produce the hot oil, where the temperature of the hot oil is between 100° C. and 380° C. In certain aspects, the water is deionized water. In certain aspects, the oil feed is selected from the group consisting of light crude oil, naphtha, diesel, residue oil, condensate, plastics, and combinations of the same. In certain aspects, the volumetric flow rate ratio of water to oil in the reactor feed is between 5 and 15. In certain aspects, the process further includes the step of injecting a gas stream into the catalytic reactor, where the gas stream is an inert gas selected from the group consisting of oxygen, nitrogen, air, and combinations of the same. In certain aspects, the process further includes the steps of introducing the liquid stream to a liquid separator, and separating the liquid stream in the liquid separator to produce a water stream and an upgraded hydrocarbon stream, where the water stream includes water and spent catalyst, where the upgraded hydrocarbon stream includes upgraded hydrocarbons. In certain aspects, the process further includes the steps of introducing the water stream to a regeneration unit, separating the water and spent catalyst in the water stream, regenerating the spent catalyst to produce regenerated catalyst, where the regeneration occurs at a temperature between 750° C. and 850° C. and a pressure between 3 bar and 6 bar such that contaminants are removed from the spent catalyst, and mixing the regenerated catalyst with a makeup catalyst stream to produce a fresh catalyst stream, where the fresh catalyst stream includes the catalyst. In certain aspects, the transition metals of the transition metal oxides and lanthanides of the lanthanide metal oxides of the catalyst are selected from the group consisting of nickel, vanadium, cerium, lanthanum, zinc, copper, cobalt, titanium, chromium, and combinations of the same.

A system for hydrogen production, the system includes a mixer configured to mix a hot water and a hot oil to produce a mixed stream, a combined heater fluidly connected to the mixer, the combined heater configured to increase a temperature of the mixed stream to produce a reactor feed, where the temperature of the reactor feed is between 374° C. and 500° C. and the pressure is between 22 MPa and 30 MPa, a non-catalytic reactor fluidly connected to the combined heater, the non-catalytic reactor configured to upgrade the reactor feed to produce a non-catalytic effluent, where a temperature in non-catalytic reactor is between 375° C. and 500° C. and a pressure is between 22 MPa and 30 MPa, where the non-catalytic reactor is in the absence of catalyst, where hydrocarbons undergo cracking in the non-catalytic reactor, a catalytic reactor fluidly connected to the non-catalytic reactor, the catalytic reactor configured to upgrade a catalytic feed to produce a reactor effluent, where the catalytic feed includes the non-catalytic effluent mixed with a catalyst, where a temperature in the catalytic reactor is between 550° C. and 700° C. and a pressure is between 22 MPa and 30 MPa, where the catalyst is selected from the group consisting of transition metal oxides, lanthanide oxides, and combinations of the same, where the size of the catalyst is between 1,000 nm and 5,000 nm, a high pressure separator fluidly connected to the catalytic reactor, the high pressure separator configured to separate the reactor effluent to produce a gases stream and a liquid stream, and a gases separator fluidly connected to the high pressure separator, the gases separator configured to separate the gases stream to produce a gas produce and a light hydrocarbon stream, where the gases stream includes gases selected from light hydrocarbon gases, hydrogen, carbon monoxide, carbon dioxide, and combinations of the same.

In certain aspects, the system further includes a water pump configured to increase a pressure of a water stream to produce a pressurized water, where a pressure of the pressurized water is between 22 MPa and 30 MPa, and a water heater fluidly connected to the water pump, the water heater configured to increase a temperature of the pressurized water in the water heater to produce the hot water, where a temperature of the hot water is between 350° C. and 500° C. In certain aspects, the system further includes an oil pump configured to increase a pressure of an oil feed to produce a pressurized oil, where a pressure of the pressurized oil is between 22 MPa and 30 MPa, and an oil heater fluidly connected to the oil pump, the oil heater configured to increase a temperature of the pressurized oil to produce the hot oil, where the temperature of the hot oil is between 100° C. and 380° C. In certain aspects, the system further includes a liquid separator fluidly connected to the high pressure separator, the liquid separator configured to separate the liquid stream to produce a water stream and an upgraded hydrocarbon stream, where the water stream includes water and spent catalyst, where the upgraded hydrocarbon stream includes upgraded hydrocarbons. In certain aspects, the system further includes a regeneration unit fluidly connected to the liquid separator, the regeneration unit configured to regenerate spent catalyst in the water stream, where regeneration occurs at a temperature between 750° C. and 850° C. and a pressure between 3 bar and 6 bar such that contaminants are removed from the spent catalyst. In certain aspects, the mixer is selected from the group consisting of a standard inline mixer, a static mixer, and combinations of the same. In certain aspects, the non-catalytic reactor is a tubular reactor. In certain aspects, the catalytic reactor is a tubular reactor.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
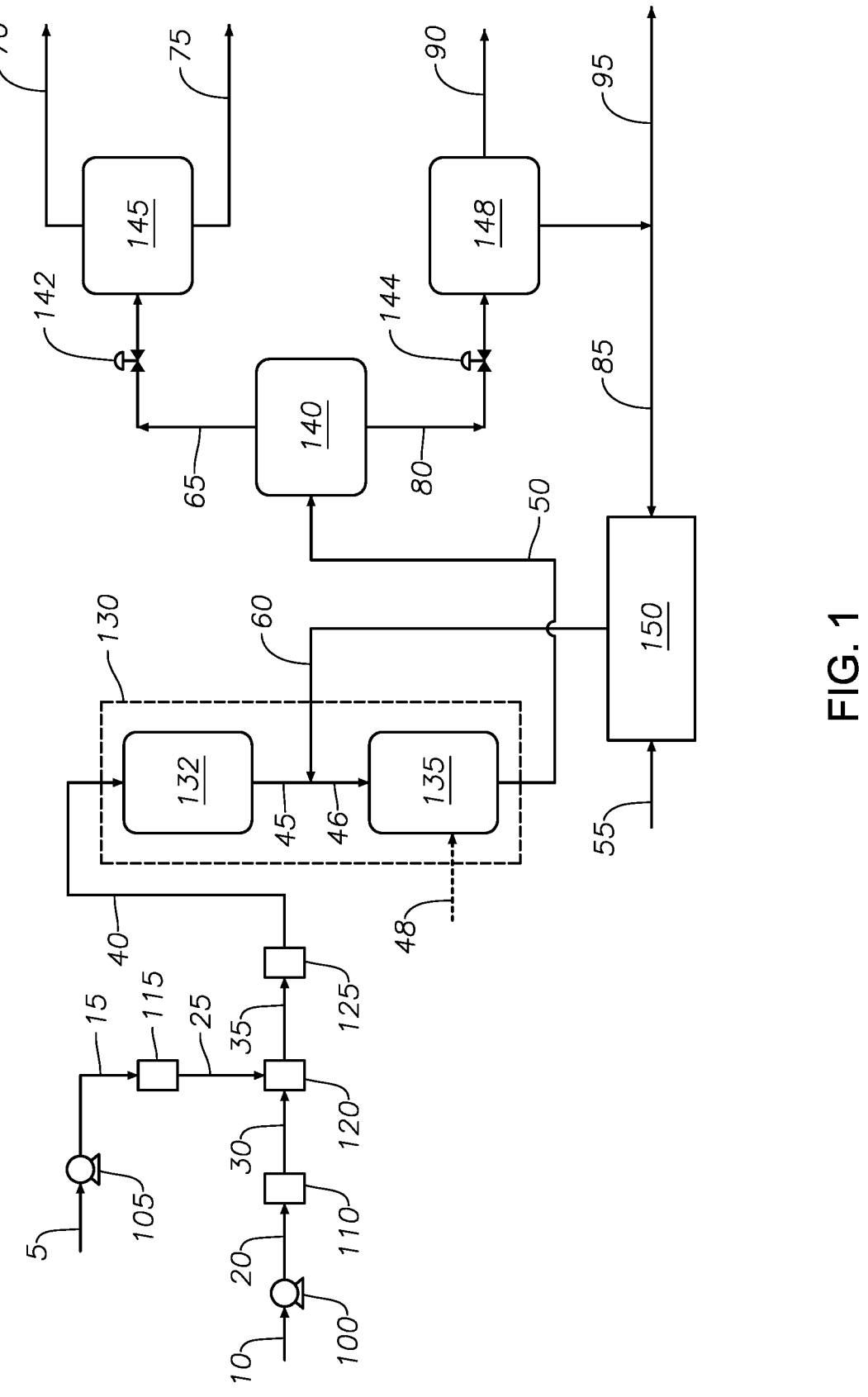
FIG. 1 is a process flow diagram of an embodiment of the process for producing hydrogen.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The systems and processes for hydrogen production via a twostep process includes a supercritical water hydrothermal step followed by a catalytic supercritical water gasification step. The systems and method produce hydrogen by catalytic oil steam reforming facilitated by staged supercritical water reactors. The systems processes involve upgrading hydrocarbons in a first reactor hydrothermally to reduce the molecular size of large hydrocarbons and then gasifying the smaller size hydrocarbons utilizing a catalyst in a second reactor. The catalyst in the second reactor can be partially recycled and mixed with fresh catalyst and sent to the second reactor. The effluent stream from the two-stage reactor system is sent to a high-pressure separator to separate the light hydrocarbon gases from the liquid hydrocarbons and water. Advantageously, the two-step process can maximize hydrogen yield from liquid hydrocarbons by utilizing a two-stage reactor system under supercritical water conditions. Advantageously, the systems and processes maximize hydrogen production in the total produced gas.

As used throughout, "external source of hydrogen" refers to the addition of hydrogen to the feed to the reactor or to the reactor itself. For example, a reactor in the absence of an external source of hydrogen means that the feed to the reactor and the reactor are in the absence of added hydrogen, gas ($H_2$) or liquid, such that no hydrogen (in the form $H_2$) is a feed or a part of a feed to the reactor.

As used throughout, "external source of catalyst" refers to the addition of catalyst to the feed to the reactor or to the reactor itself. For example, a reactor in the absence of an external source of catalyst means that the feed to the reactor and the reactor are in the absence of catalyst, such that no catalyst is a feed or a part of a feed to the reactor or is charged in the reactor.

As used throughout, "external source of oxidant" refers to the addition of an oxidant to the feed to the reactor or to the reactor itself. For example, a reactor in the absence of an external source of oxidant means that the feed to the reactor and the reactor are in the absence of added oxidant, oxygen ($O_2$) or oxidizing agent, such that no oxidant is a feed or a part of a feed to the reactor.

As used throughout, "supercritical water" refers to water at a temperature at or greater than the critical temperature of water and at a pressure at or greater than the critical pressure of water. The critical temperature of water is 373.946° C. The critical pressure of water is 22.06 megapascals (MPa). It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The hydrogen can be transferred to hydrocarbons in desulfurization reactions, demetallization reactions, denitrogenation reactions, and combinations.

As used throughout, "coke" refers to the toluene insoluble material present in petroleum.

As used throughout, "cracking" refers to the breaking of hydrocarbons into smaller ones containing few carbon atoms due to the breaking of carbon-carbon bonds.

As used throughout, "upgrade" or "upgrading" means one or all of increasing API gravity, decreasing the amount of heteroatoms, including sulfur atoms, nitrogen atoms, metal atoms, and oxygen atoms, decreasing the amount of asphaltene, increasing the middle distillate yield, decreasing the viscosity, and combinations of the same, in a process outlet stream relative to the process feed stream. One of skill in the art understands that upgrade can have a relative meaning such that a stream can be upgraded in comparison to another stream, but can still contain undesirable components such as heteroatoms.

Referring to FIG. 1 an embodiment for the system and process for hydrogen production is provided. Water stream 5 is pressurized in water pump 105 to produce pressurized water 15. The water in water stream 5 can be from any source of deionized water. The water in water stream 5 can have a conductivity less than 1 microsiemens (μS)/centimeter (cm), alternately less than 0.5 μS/cm, and alternately less than 0.1 μS/cm. The water in water stream 5 can have a sodium content less than 5 micrograms (μg)/liter and alternately less than 1 μg/liter. The water in water stream 5 can have a chloride content less than 5 μg/liter and alternately less than 1 μg/liter. The water in water stream 5 can have a silica content less than 3 μg/liter. Water pump 105 can be any type of pump capable of increasing a pressure of a water stream. The pressure of pressurized water 15 can be between 22 MPa and 30 MPa. Pressurized water stream 15 can be introduced to water heater 115.

The temperature of pressurized water stream 15 can be increased in water heater 115 to produce hot water 25. Water heater 115 can be any type of heat exchanger capable of increasing the temperature of water stream above the critical temperature. Examples of water heater 115 include fired heater, heat exchangers, fluidized bed combustion boilers, electric immersion heaters, and combinations of the same. Hot water 25 can be at a temperature between 350° C. and 500° C. Hot water 25 can be introduced to mixer 120.

Oil feed 10 is pressurized in oil pump 100 to produce pressurized oil 20. Oil feed 10 can be selected from light crude oil, naphtha, diesel, residue oil, condensate, plastics, and combinations of the same. Oil feed 10 can have a sulfur content less than 0.5 (weight percent) wt %. Oil feed 10 can have a nitrogen content less than 500 parts-per-million by weight (wt ppm). Oil feed 10 can have an oxygen content less than 50 wt ppm. Oil pump 100 can be any type of pump capable of increasing a pressure of a hydrocarbon stream. The pressure of pressurized oil 20 can be between 22 MPa and 30 MPa. Pressurized oil 20 can be introduced to oil heater 110.

The temperature of pressurized oil 20 can be increased in oil heater 110 to produce hot oil 30. Oil heater 110 can be any type of heat exchanger capable of increasing the temperature of a hydrocarbon stream. Examples of oil heater 110 include heat exchangers, fired heaters, and combinations of the same. Hot oil 30 can be at a temperature between 100° C. and 380° C. and alternately between 150° C. and 200° C. Hot oil 30 can be introduced to mixer 120.

Hot water 25 and hot oil 30 can be mixed in mixer 120 to produce mixed stream 35. Mixer 120 can be any type of mixer capable of mixing a supercritical water stream and a hydrocarbon stream. Examples of mixer 120 include a standard inline mixer, a static mixer, or combinations of the same. Mixed stream 35 can be introduced to combined heater 125.

The temperature of mixed stream 35 can be increased in combined heater 125 to produce reactor feed 40. Combined heater 125 can be any type of heat exchanger capable of increasing the temperature of a mixed water and hydrocarbon stream. Examples of combined heater include fired heaters, heat exchangers, electric immersion heaters, and combinations of the same. Reactor feed 40 is at temperature and pressure greater than the supercritical conditions of water. The temperature of reactor feed 40 can be greater than 374° C., alternately greater than 380° C., alternately between 374° C. and 500° C., and alternately between 400° C. and 440° C. The volumetric flow rate ratio of water to oil in reactor feed 40 is between 5 and 15, and alternately between 7 and 12. Reactor feed 40 can be introduced to supercritical reactor unit 130.

Supercritical reactor unit 130 includes non-catalytic reactor 132 followed in series by catalytic reactor 135. Advantageously, the two reactors in series function in a synergetic mode. Non-catalytic reactor 132 prepares the oil in reactor feed 40 to be efficiently gasified in catalytic reactor 135 to maximize hydrogen production selectively. Non-catalytic reactor 132 improves the oil API and reduces the viscosity of the oil by reducing the size of the large hydrocarbon molecules. Large hydrocarbon molecules have limited ability to penetrate though to the surface of catalyst particles to get adsorbed, react, and desorbed, which limits the overall conversion of reactants to the required products. Non-catalytic reactor 132 can reduce molecular sizes of large hydrocarbon molecules such as polycondensed aromatics including asphaltenes and coke precursors and can convert them to smaller molecules. These smaller molecules have higher affinity to adsorb, react, and desorb over the catalyst surfaces in catalytic reactor 135, which advantageously improves gasification product yield that can selectively be improved.

It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Supercritical water is water at a temperature at or greater than the critical temperature of water and at a pressure at or greater than the critical pressure of water. The critical temperature of water is 373.946° C. The critical pressure of water is 22.06 megapascals (MPa). Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The hydrogen can be transferred to hydrocarbons in desulfurization reactions, demetallization reactions, denitrogenation reactions, and combinations of the same. The hydrogen can also reduce the olefin content. The production of an internal supply of hydrogen can reduce coke formation.

Without being bound to a particular theory, it is understood that the basic reaction mechanism of supercritical water mediated petroleum processes is the same as a free radical reaction mechanism. Radical reactions include initiation, propagation, and termination steps. With hydrocarbons, initiation is the most difficult step and conversion in supercritical water can be limited due to the high activation energy required for initiation. Initiation requires the breaking of chemical bonds. The bond energy of carbon-carbon bonds is about 350 kJ/mol, while the bond energy of carbon-hydrogen is about 420 kJ/mol. Due to the chemical bond energies, carbon-carbon bonds and carbon-hydrogen bonds do not break easily at the temperatures in a supercritical water process, 380° C. to 450° C., without catalyst or radical initiators. In contrast, aliphatic carbon-sulfur bonds have a bond energy of about 250 kJ/mol. The aliphatic carbon-sulfur bond, such as in thiols, sulfide, and disulfides, has a lower bond energy than the aromatic carbon-sulfur bond.

Thermal energy creates radicals through chemical bond breakage. Supercritical water creates a "cage effect" by surrounding the radicals. The radicals surrounded by water molecules cannot react easily with each other, and thus, intermolecular reactions that contribute to coke formation are suppressed. The cage effect suppresses coke formation by limiting inter-radical reactions. Supercritical water, having a low dielectric constant compared to liquid phase water, dissolves hydrocarbons and surrounds radicals to prevent the inter-radical reaction, which is the termination reaction resulting in condensation (dimerization or polymerization). Moreover, the dielectric constant of supercritical water can be tuned by adjusting the temperature and pressure. Because of the barrier set by the supercritical water cage, hydrocarbon radical transfer is more difficult in supercritical water as compared to conventional thermal cracking processes, such as delayed coker, where radicals travel freely without such barriers.

Non-catalytic reactor 132 can operate at a temperature between 375° C. and 500° C. and alternately between 400° C. and 440° C. and a pressure between 22 MPa and 30 MPa. Non-catalytic reactor 132 is in the absence of an external source of oxidant, such as an oxidizing agent. Non-catalytic reactor 132 is in the absence of an external source of catalyst. Non-catalytic reactor 132 is in the absence of an external source of hydrogen. Non-catalytic reactor 132 can be a tubular reactor constructed from corrosion resistant materials including Inconel, stainless steel or similar. The residence time in non-catalytic reactor 132 can be in the range between about 0.01 min and about 1.0 min and alternately between about 0.1 min and about 0.5 min.

Catalytic reactor 135 can operate at a temperature between 550° C. and 700° C. and alternately between 625° C. and 675° C. and a pressure between 22 MPa and 30 MPa. Catalytic reactor 135 can be a tubular reactor made from corrosion resistant materials including Inconel, stainless steel or similar. The residence time in non-catalytic reactor 132 can be in the range between about 0.01 min and about 1.0 min and alternately between about 0.1 min and about 0.5 min.

Non-catalytic effluent 45 from non-catalytic reactor 132 can be mixed with fresh catalyst 60 stream to produce catalytic feed 46. Catalytic feed 46 can be introduced to catalytic reactor 135.

The catalyst in catalytic reactor 135 can include transition metals oxides, lanthanide oxides, and combinations of the same. The catalyst is in oxides form to reduce coke deposition and enhance gasification. The metals in the transitional metal oxides and lanthanide oxides can include nickel, vanadium, cerium, lanthanum, zinc, copper, cobalt, titanium, chromium, and combinations of the same. The catalyst is in the absence of lithium, sodium, and potassium salts. The size of the catalyst particles can be in the range between 1,000 nm and 5,000 nm. In an alternate embodiment, catalytic reactor 135 can be a fixed bed reactor charged with the catalyst prior to introduction of non-catalytic effluent 45.

In at least one embodiment, gas stream 48 can be injected to catalytic reactor 135 to support gasification, eliminate coke formation and increase the temperature in catalytic reactor 135. Gas stream 48 can include an inert gas, such as oxygen, nitrogen, air, and combination of the same.

Reactor effluent 50 can be introduced to high pressure separator 140. High pressure separator 140 can be any separation device known in the art capable of separating an effluent stream from a supercritical reactor. Reactor effluent 50 is separated in high pressure separator 140 to produce gases stream 65 and liquid stream 80. Gases stream 65 can include light hydrocarbon gases, hydrogen, carbon monoxide, carbon dioxide, and combinations of the same. Liquid stream 80 can include liquid hydrocarbons. Liquid hydrocarbons can include diesel, naphtha, distillates, heavy product, and water. The catalyst from catalytic reactor 135 is contained in the water in liquid stream 80. Operating conditions in high pressure separator 140 are selected based on the gaseous content of gases stream 65 and the water content in liquid stream 80. The water in liquid stream 80 is less than 5 vol % and alternately between 0.5 vol % and 1 vol %. Gas yield of gases stream 65 is between 30% and 80% and alternately between 40% and 70%.

Valves 142 and 144 on the lines from high pressure separator 140 can control the pressure in high pressure separator 140. The valves can be any type of valves capable of controlling high pressure in a liquid or gases stream.

Gases stream 65 is introduced to gases separator 145. Gases stream 65 can be separated in gases separator 145 to produce gas product 70 and light hydrocarbon stream 75. Gas product 70 can include the hydrogen, carbon monoxide, carbon dioxide, and combinations of the same separated in high pressure separator 140. Gas product 70 can be further treated to separate the hydrogen in gas product 70. Light hydrocarbon stream 75 can include the light hydrocarbon gases separated in high pressure separator 140.

Liquid stream 80 can be introduced to liquid separator 148. Liquid separator 148 can be any type of separator capable of separating a hydrocarbon stream and a water stream. Liquid stream 80 can be separated in liquid separator 148 to produce upgraded hydrocarbon stream 90 and water stream 85. Water stream 85 is an oil in water emulsion and can contain any catalyst that exited catalytic reactor 135 in reactor effluent 50. Slip stream 95 can be separated from water stream 85 to recover the water.

Water stream 85 can be introduced to regeneration unit 150. Regeneration unit 150 can be any type of catalyst regeneration unit capable of separating spent catalyst from water and then regenerating spent catalyst by removing any contaminants. In at least one embodiment, regeneration unit 150 can operate at a temperature between 750° C. and 850° C. and a pressure between 3 bar and 6 bar. Catalyst makeup stream 55 can be introduced to regeneration unit 150. Catalyst makeup stream 55 can contain new catalyst. The new catalyst in catalyst makeup can be mixed with the regenerated catalyst produced in regeneration unit 150 to produce fresh catalyst stream 60. Heavier feeds can require more regeneration.

In an alternate embodiment, catalytic reactor 135 is a fixed bed reactor and regeneration unit 150 enables swing operation allowing catalytic reactor 135 to regenerate.

The processes and systems to produce hydrogen are in the absence of membranes. Advantageously, the processes and systems maximize hydrogen production and are in the absence of consuming production in situ. Surprisingly and unexpectedly, the processes and systems of supercritical water hydrothermal reaction followed by catalytic supercritical water gasification reaction maximize hydrogen production at the expense of liquid yield.

EXAMPLE

The example is a working example based on lab experiments. The oil feed was an atmospheric residue from an Arabian light crude oil from a crude distillation unit having the properties in Table 1.

TABLE 1

Properties of the feed oil.

|  | Units | Property |
|---|---|---|
| Density | Kg/m$^3$ | 890 |
| Sulfur | wt % | 0.5 |
| Viscosity @ 40° C. | cSt | 5 |
| Carbon Residue | Wt % | <1 |

The water stream was a deionized water and specifically an ASTM Type 1 water produced by a water purification system having a conductivity of about 0.056 μS/cm and a sodium content of less than 1 wt ppb.

The flow rate of the oil feed was 57.2 g/h. The flow rate of the water stream was 475.8 g/h. The catalyst was a zinc oxide/large pore alumina. The residence time was 11.7 seconds. The operating temperature in the catalytic reactor was 675° C. and the operating pressure was 250 bar. The total mass balance of oil, gas and coke are described in Table 2. The gas distribution in the reactor effluent is shown in Table 3.

TABLE 2

Mass Balance around reactor

|  | Mass Balance | | |
|---|---|---|---|
|  | Oil | Gas | Coke |
| Oil Feed (g/h) | 57.20 |  |  |
| Reactor Effluent (g/h) | 9.13 | 47.49 | 0.076 |
|  | Coke | Gas | Liquid |
| Product Distribution (wt %) | 0.13 | 83.76 | 16.11 |

TABLE 3

Gas distribution of reactor effluent
Gas Distribution (mol %)

| | |
|---|---|
| H$_2$ | 15% |
| CO$_2$ | 10% |
| C$_1$ | 40% |
| C$_2$ | 11% |
| C$_2$=/C$_3$= | 14% |
| C$_3$ | 10% |

The following data was generated by ASPEN-HYSYS based on experimental data. The reactor was non-catalytic. Feedstock was atmospheric residue having API gravity of 12.7 degrees. Product from the process is lighter than feedstock. Yield of liquid-phase hydrocarbons is around 94 wt % with around 6 wt % of feed goes into gas-phase product and water product.

TABLE 4

Properties of feed and product from non-catalytic reactor

| Properties | | Feed | Oil Product |
|---|---|---|---|
| Mass Flow (kg/hour) | | 49.0 | 46.2 |
| Specific Gravity (Degree) | | 12.7 | 23.2 |
| Distillation | 5% | 362 | 258 |
| (TBP) | 10% | 390 | 301 |
| | 30% | 468 | 378 |
| | 50% | 524 | 420 |
| | 70% | 588 | 468 |
| | 90% | 653 | 541 |
| | 95% | 673 | 571 |
| Total Sulfur Content(wt %) | | 4.0 | 3.4 |
| Viscosity(cSt) at 50° C. | | 640 | 27 |
| Asphaltene (Heptane-insoluble) | | 4.8 | 0.3 |
| Metals (V and Ni) (wtppm) | | 83 | 4 |

Figure 2:
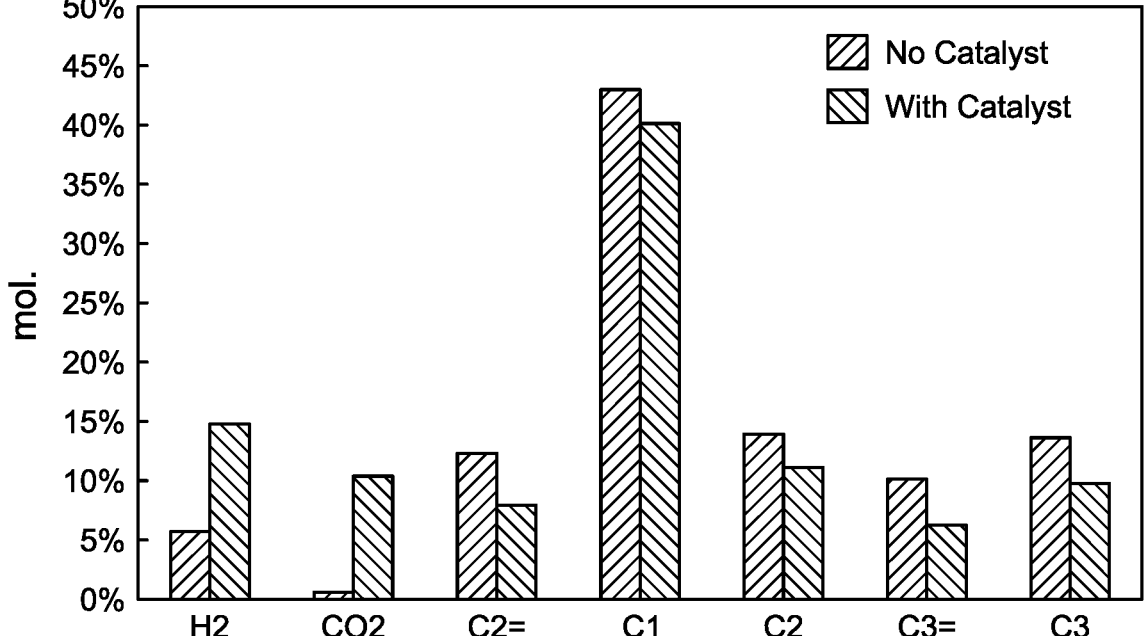
FIG. 2 is an graphic comparison of the product yield of a catalytic and non-catalytic hydrothermal process.

FIG. 2 is a comparison of the product yield of an effluent stream from a non-catalytic reactor compared to the data in Table.

The non-catalytic reactor pre-cracks large hydrocarbons and exposes the heteroatoms and then the catalytic reactor facilitates increased cracking and consequently increased light fractions and increased gas yield.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A system for hydrogen production, the system comprising:

a mixer configured to mix a hot water and a hot oil to produce a mixed stream;

a combined heater fluidly connected to the mixer, the combined heater configured to increase a temperature of the mixed stream to produce a reactor feed, wherein the temperature of the reactor feed is between 374° C. and 500° C. and the pressure is between 22 MPa and 30 MPa;

a non-catalytic reactor fluidly connected to the combined heater, the non-catalytic reactor configured to upgrade the reactor feed to produce a non-catalytic effluent, wherein a temperature in non-catalytic reactor is between 375° C. and 500° C. and a pressure is between 22 MPa and 30 MPa, wherein the non-catalytic reactor is in the absence of catalyst, wherein hydrocarbons undergo cracking in the non-catalytic reactor;

a catalytic reactor fluidly connected to the non-catalytic reactor, the catalytic reactor configured to upgrade a catalytic feed to produce a reactor effluent, wherein the catalytic feed comprises the non-catalytic effluent mixed with a catalyst, wherein a temperature in the catalytic reactor is between 550° C. and 700° C. and a pressure is between 22 MPa and 30 MPa; wherein the catalyst is selected from the group consisting of transition metal oxides, lanthanide oxides, and combinations of the same, wherein the size of the catalyst is between 1,000 nm and 5,000 nm;

a high pressure separator fluidly connected to the catalytic reactor, the high pressure separator configured to separate the reactor effluent to produce a gases stream and a liquid stream;

a gases separator fluidly connected to the high pressure separator, the gases separator configured to separate the gases stream to produce a gas produce and a light hydrocarbon stream, where the gases stream comprises gases selected from light hydrocarbon gases, hydrogen, carbon monoxide, carbon dioxide, and combinations of the same;

a liquid separator fluidly connected to the high pressure separator, the liquid separator configured to separate the liquid stream to produce a water stream and an upgraded hydrocarbon stream, wherein the water stream comprises water and spent catalyst, wherein the upgraded hydrocarbon stream comprises upgraded hydrocarbons; and a regeneration unit fluidly connected to the liquid separator, the regeneration unit configured to regenerate spent catalyst in the water stream, wherein regeneration occurs at a temperature between 750° C. and 850° C. and a pressure between 3 bar and 6 bar such that contaminants are removed from the spent catalyst.

2. The system of claim 1, further comprising:

a water pump configured to increase a pressure of a water stream to produce a pressurized water, where a pressure of the pressurized water is between 22 MPa and 30 MPa; and a water heater fluidly connected to the water pump, the water heater configured to increase a temperature of the pressurized water in the water heater to produce the hot water, wherein a temperature of the hot water is between 350° C. and 500° C.

3. The system of claim 1, further comprising:

an oil pump configured to increase a pressure of an oil feed to produce a pressurized oil, where a pressure of the pressurized oil is between 22 MPa and 30 MPa; and an oil heater fluidly connected to the oil pump, the oil heater configured to increase a temperature of the pressurized oil to produce the hot oil, where the temperature of the hot oil is between 100° C. and 380° C.

4. The system of claim 1, where the transition metals of the transition metal oxides and lanthanides of the lanthanide metal oxides of the catalyst are selected from the group consisting of nickel, vanadium, cerium, lanthanum, zinc, copper, cobalt, titanium, chromium, and combinations of the same.

5. The system of claim 1, wherein the mixer is selected from the group consisting of a standard inline mixer, a static mixer, and combinations of the same.

6. The system of claim 1, wherein the non-catalytic reactor is a tubular reactor.

7. The system of claim 1, wherein the catalytic reactor is a tubular reactor.

*     *     *     *     *